Jan. 15, 1946. A. H. HABERSTUMP 2,392,918
FAUCET
Filed Jan. 19, 1942
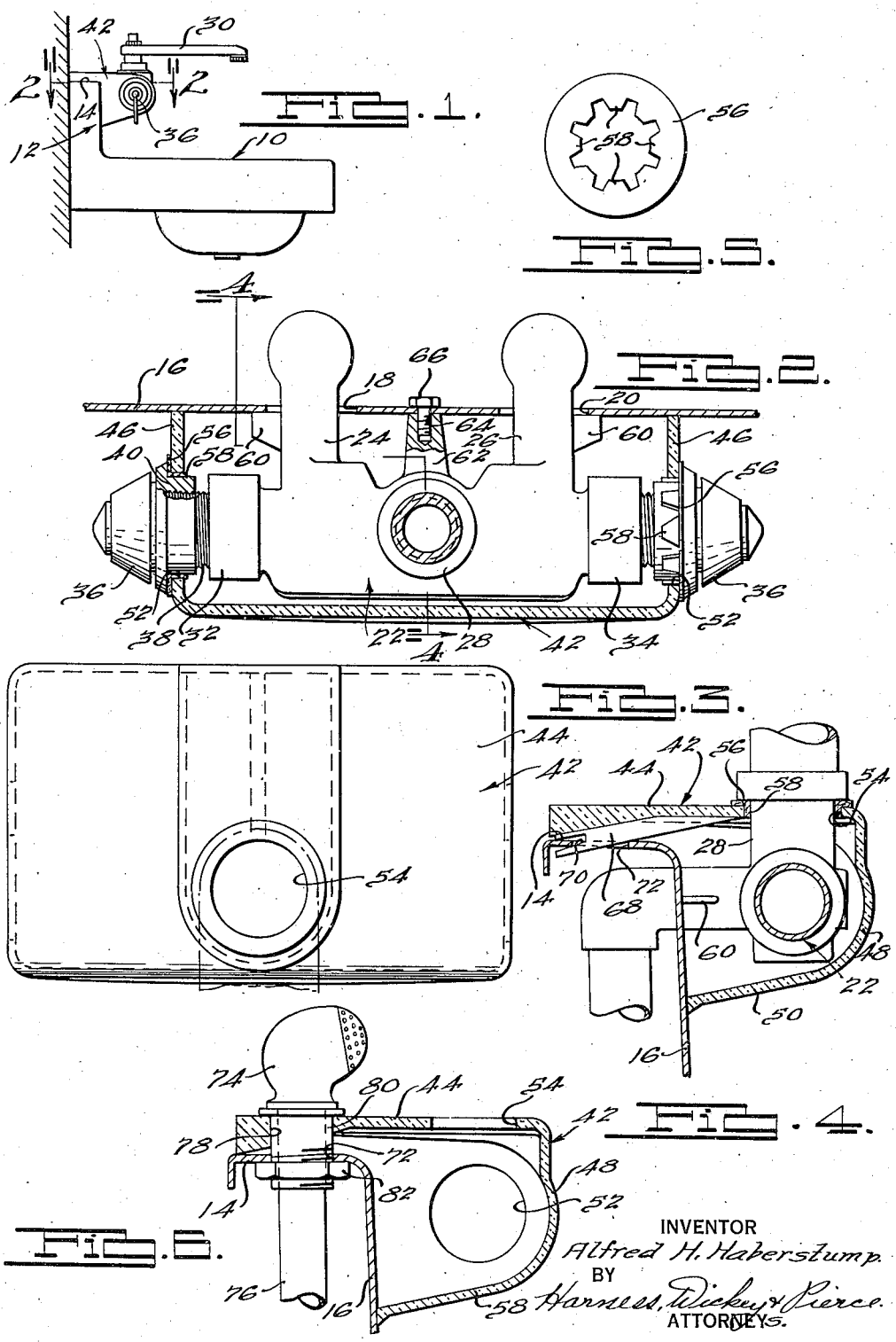
INVENTOR
Alfred H. Haberstump
BY
Harness, Dickey & Pierce
ATTORNEYS Patented Jan. 15, 1946

2,392,918

UNITED STATES PATENT OFFICE 2,392,918

FAUCET

Alfred H. Haberstump, Detroit, Mich., assignor to The Murray Corporation of America, Detroit, Mich., a corporation of Delaware Application January 19, 1942, Serial No. 427,333

2 Claims. (Cl. 137—111)

The present invention relates to plumbing fixtures, and particularly relates to improvements in faucet fixtures, such as those disclosed and claimed in the co-pending application of Alfred H. Haberstump, Serial No. 357,870, filed September 23, 1940.

One of the primary objects of the present invention is to provide improvements in faucet fixtures of the type mentioned, whereby such fixtures are more economical to construct than prior fixtures of the same type.

A further object is to provide improvements in faucet fixtures of the type mentioned in which thermoplastic materials may be used and in which such materials are insulated from the relatively hot metallic parts of the plumbing fixture.

Other objects of the invention will become apparent from the following specification, the drawing relating thereto, and from the claims hereinafter set forth.

In the drawing, in which like numerals are used to designate like parts in the several views throughout:

Figure 1 is a side elevational view of a sink having a faucet mounted thereon embodying features of the present invention;

Figure 2 is an enlarged cross-sectional view, taken substantially along the line 2—2 of Fig. 1;

Figure 3 is a top plan view of the housing or casing of the faucet fixture shown in Figs. 1 and 2;

Figure 4 is a cross-sectional view taken substantially along the line 4—4 of Fig. 2, and illustrating the manner in which the housing is attached to the sink;

Figure 5 is a plan view of an insulating washer employed with the present invention; and, Figure 6 is a view similar to Fig. 4, illustrating a modified form of the present invention.

In general, according to the present invention, a hollow valve body is provided which includes the hot and cold water inlets, with a common outlet, and valve means for controlling the flow of water through the outlet. Such valve body and the valves are enclosed within a housing, with the operating means for the valves projecting through the ends of the housing and with the operating levers on the exterior thereof. The housing is formed of a thermoplastic material, such as cellulose acetate, and the metal parts forming the valve body and the valve operating means are insulated from the thermoplastic housing so that such housing will not be distorted or otherwise injured because of temperature rise in the metal parts. The valve body and the housing are so constructed that they may be readily mounted to the rear wall or ledge of a sink or the splashboard of a lavatory.

Referring to the drawing, and referring particularly to Figs. 1 through 5 thereof, in which one embodiment of the present invention is illustrated, a sink is generally indicated at 10, having one or more sumps and having a splashboard generally indicated at 12. Such splashboard 12 has a substantially horizontal upper ledge 14. The front wall of the splashboard 12 is indicated at 16 and is provided with apertures 18 and 20 therethrough through which the inlets to the valve body extend.

The assembly of the present invention includes an elongated, hollow valve body 22, which is formed of metal and which has hot and cold water inlets 24 and 26 integrally formed therewith. The inlet conduits 24 and 26 project through openings 18 and 20, respectively, when the assembly is mounted on the sink; and such conduits 24 and 26 terminate in bulbous ends which are turned downwardly at a right angle to the axes of the conduits 24 and 26. Such ends are internally threaded and are adapted to be directly connected to the hot and cold water conduits leading from the hot and cold water sources. The conduits 24 and 26 communicate through hollow passageways having individual valve seats therein with a central outlet chamber which leads to an upstanding outlet 28. Such outlet 28 is connected through suitable fittings with a swingable nozzle 30.

A valve for each of the hot and cold water conduits is provided within the valve body 22 for controlling the passage of hot and cold water to the outlet.

The valve operating mechanism for each of the valves projects laterally through the ends 32 and 34 of the valve body, and is connected to valve handles 36. Each of such valve handles 36 has an operating shaft which is connected to its valve which extends through a threaded pipe connection 38. Such pipe connection is externally threaded to the internal threads on the body ends 32 and 34. A grommet 40 is threaded to the outer end of each of the pipes 38 to mount the valve handle to the pipe connection 38, and to provide the connection between the valve body and the housing, generally indicated at 42, for supporting the valve body and operating levers on the housing.

Such housing 42 is formed of a thermoplastic material, as mentioned above, and such housing 42 includes a top web or wall 44, and having side walls 46. The rear corners of the side walls 46 are cut out so that the housing may be fitted to the wall 16 of the splashboard, as indicated in Fig. 4. The housing is also formed with a front flange or wall 48 which extends rearwardly on the underside thereof, as indicated at 50, to abut against the wall 16 and form a closure for the front of the housing. The rear edges of the side walls 46 also abut against the wall 16, as best seen in Fig. 2.

The side walls 46 are provided with apertures 52 therethrough and the top wall is provided with an aperture 54 therethrough. The means connecting the handles with the valves for supporting the valve body 22 on the housing extend through the openings 52, and it will be seen from viewing Fig. 2 that the longitudinal portion of the grommet 40 extends through the aperture 52 with the annular shoulder overlying the edges of the aperture. The outlet conduit 28 of the valve body 22 extends upwardly through the aperture 54 of the housing 42.

It will be appreciated that the valve body and the operating parts thereof are formed of metal, usually one which is a good conductor of heat, so that when hot water is being drawn through the valve body it becomes quite hot. In order to prevent damage to the thermoplastic housing 42 the metal parts are insulated from the housing. Such insulating means is in the form of a washer 56 which is internally notched on the inside diameter thereof to provide tabs 58. The washer 56 is formed of relatively thin sheets of paper or cardboard, and is positioned between the grommets 40 and the outer surface of the conduit 28 so that the peripheral portion abuts against the outer surface of the housing 42, with the tabs 58 extending inwardly along the walls of openings 52 and 54, as best seen in Figs. 2 and 4. It will thus be seen that the thermoplastic housing 42 is insulated from the metal parts of the faucet assembly and that such metal parts are supported as a unit by the housing 42.

The housing 42, together with the valve body and the operating parts thereof, may then be mounted directly as a unit to the splashboard 22. To provide for such mounting, the conduits 24 and 26 of the valve body are provided with integral projections 60 having inner edges which are adapted to abut against the front face of the wall 16 when the conduits 24 and 26, including the bulbous ends thereof, are inserted through openings 18 and 20. The valve body 22 is further connected to the wall 16 through an integral, rearward projection 62 which is adapted to abut against the wall 16 and which is provided with a tapped opening 64 in the end thereof for the reception of a screw 66 which extends through an aligned aperture in the wall 16.

To hold the housing 42 to the splashboard the top wall 44 of such housing is thickened somewhat along the rear edge thereof, and is formed with an integral, depending web 68 on the underside thereof which extends transversely of the housing and which terminates adjacent the rear edge of the opening 54. Such depending web is notched, as indicated at 70, and the notched end of the web is adapted to project through an opening 72 formed in the top ledge 14 so that the notch engages the back edge of the aperture 72, as best shown in Fig. 4.

Referring to Fig. 6, a modified embodiment of the present invention is illustrated, in which the housing 42 is slightly modified for connection to the splashboard 16 when a sprinkling or spray head 74, having a hose connection 76, is employed. To provide for the spray head 74, the web 68, above described, is dispensed with and an aperture 78 is provided through the top wall 44 of the housing adjacent the rear edge thereof and substantially midway between the sides thereof. Such aperture 78 is adapted to overlie the aperture 72 of the ledge 14, and a grommet 80 is positioned through the apertures 78 and 72, with the annular flange thereof lying against the top surface of the wall 44. The lower end of the grommet 80 is externally threaded and is adapted to receive a nut 82 thereon which is drawn up against the underside of the ledge 14 for securing the casing 42 to the ledge 14.

The hose 76 extends through the passageway in the grommet 80 so that the spray head 74 may be lifted from its seat on the annular portion of the grommet and may be used in the usual way.

The spray head 74 is connected to its source of supply in the same manner as that described in the above-mentioned Haberstump application, and the valve body 22 is modified to provide an outlet leading to the conduit 76 in the same way as provided in the Haberstump application. The valve body, valves, and operating means for the valves are otherwise mounted to the housing 42 and the wall 16 in the same manner as described above in connection with the embodiment shown in Figs. 1 through 5.

What is claimed is:

1. A faucet fixture assembly comprising a housing having a top wall and side walls adapted to be attached to an upstanding wall member having a pair of openings therethrough and terminating in a substantially horizontal ledge provided with an opening therethrough, the rear edges of said side walls being adapted to abut against said wall member, said top wall being adapted to overlie said ledge and over the opening thereto, a depending web formed on the underside of said top wall and terminating in a notch adapted to engage the edge of said last named opening, a valve body disposed within said housing and connected thereto, said valve body having integral water inlet portions projecting rearwardly therefrom and adapted to project through the openings in the upstanding wall member.

2. A faucet fixture assembly comprising a housing having a top wall and side walls adapted to be attached to an upstanding wall member having a pair of openings therethrough and terminating in a substantially horizontal ledge provided with an opening therethrough, the rear edges of said side walls being adapted to abut against said wall member, said top wall being adapted to overlie said ledge and over the opening thereto, a depending web formed on the underside of said top wall and terminating in a notch adapted to engage the edge of said last named opening, a valve body disposed within said housing and connected thereto, said valve body having integral water inlet portions projecting rearwardly therefrom and adapted to project through the openings in the upstanding wall member, and stop projections formed on said inlet portions and adapted to abut against said wall member.

ALFRED H. HABERSTUMP.